(12) United States Patent
Saito

(10) Patent No.: US 6,400,403 B1
(45) Date of Patent: Jun. 4, 2002

(54) SOLID-STATE IMAGING DEVICE HAVING IMPROVED RESOLUTION WITHOUT GENERATING A PSEUDO SIGNAL

(75) Inventor: Shinichiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/885,756

(22) Filed: Jun. 30, 1997

(30) Foreign Application Priority Data

Jul. 3, 1996 (JP) .............................. 8-173841
Jul. 3, 1996 (JP) .............................. 8-173842

(51) Int. Cl.[7] .................... H04N 3/14; H04N 9/64; H04N 5/21
(52) U.S. Cl. .................... 348/273; 348/253; 348/606
(58) Field of Search .................... 348/252, 32, 35, 348/234, 207, 222, 223, 224, 606, 625, 253, 645, 273

(56) References Cited

U.S. PATENT DOCUMENTS

| 4,887,252 A | * | 12/1989 | Muyakaua et al. | ......... 348/253 |
| 5,227,883 A | * | 7/1993 | Dischert et al. | ............ 348/606 |
| 5,274,439 A | * | 12/1993 | Dischert et al. | ............ 348/645 |
| 5,555,023 A | * | 9/1996 | Maenaher et al. | ......... 348/253 |

FOREIGN PATENT DOCUMENTS

| EP | 0 552 016 A2 | 7/1993 | |
| JP | 01109422 | * 11/1990 | ............ H04N/9/07 |
| JP | 07-298 275 A | 11/1995 | |

OTHER PUBLICATIONS

Patent Abstracts of Japan, Matsushita Electric Ind. Co. Ltd., Tatsuki et al., "Solid State Image Pickup Device", Nov. 28, 1990, No. 02288576.

* cited by examiner

Primary Examiner—Wendy R. Garber
Assistant Examiner—Luong Nguyen
(74) Attorney, Agent, or Firm—Sonnenschein, Nath & Rosenthal (57) ABSTRACT

A solid-state imaging device having a color filter of a checkered pattern arranged in an all-pixel reading solid-state image sensor includes an original signal aperture compensation device for forming an original signal aperture compensation signal from all pixels of a color filter, a luminance signal aperture compensation device for forming a luminance signal aperture compensation signal from a luminance signal obtained by synthesizing the all pixels of the color filter, and a chrominance signal ratio detecting device for detecting an output ratio of chrominance signals. The original signal aperture compensation signal and the luminance signal aperture compensation signal are weighed in response to a detection output from the chrominance signal ratio detecting device. Thereafter, the weighed original signal aperture compensation signal and the weighed luminance signal aperture compensation signal are added to obtain an aperture compensation signal.

1 Claim, 7 Drawing Sheets

Horizontal 1/4
Aperture
Compensation

FIG. 4B

Vertical 1/4
Aperture
Compensation

| A1 | B1 | A1 |
|---|---|---|
| C1 | A2 | C2 |
| A1 | B2 | A1 |

FIG. 6B

| A1 | B1 | A1 |
|---|---|---|
| C1 | A2 | C2 |
| A1 | B2 | A1 |

Horizontal 1/2 Aperture Compensation

Vertical 1/2 Aperture Compensation

SOLID-STATE IMAGING DEVICE HAVING IMPROVED RESOLUTION WITHOUT GENERATING A PSEUDO SIGNAL

BACKGROUND OF THE INVENTION

1 Field of the Invention

The present invention relates to a solid-state imaging device suitable for use in an electronic still camera and so on, for example.

2. Description of the Related Art

In general, improvement of a resolution with respect to a letter, a figure or the like an electronic still camera is demanded.

A solid-state imaging device with an improved resolution in which color filters are arranged on a surface of an all-pixel reading solid-state imaging element in an arrangement of horizontal two pixel repetition x vertical two-pixel repetition has been proposed (Japanese laid-open patent publication No. 4-729899).

A solid-state imaging device in which color filters are arranged on a surface of the all-pixel reading solid-state imaging element in an arrangement of horizontal two pixel repetition x vertical two-pixel repetition can provide an effect of improving a resolution of ½ on a vertical spatial frequency when an aperture compensation signal is generated by using pixels for the same color in every vertical lines, as compared with a solid-state imaging device of an interlace scanning system.

Such conventional solid-state imaging device can provide the above effect only when pixels for the same color are arranged in a stripe fashion in a pixel arrangement of the color filter. However, in a color solid-state imaging device in which color filters having a checkered pixel arrangement that is not a stripe arrangement of the same color pixels are arranged on a surface of the all-pixel reading solid-state imaging device, if an aperture compensation signal is generated from signals obtained from the same color pixels, then resolution is improved by ½ on a horizontal spatial frequency and also by ½ on a vertical spatial frequency, but consequently a pseudo signal is disadvantageously generated.

Figure 1A:
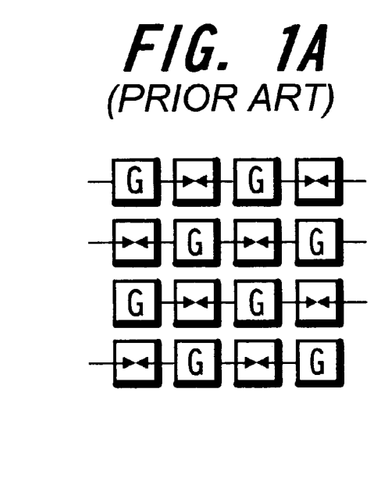
FIGS. 1A to 1E are diagrams used to explain generation of a pseudo signal.
Figure 1B:
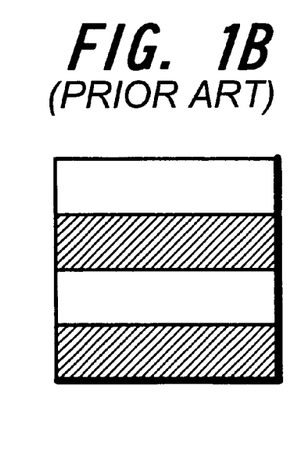
Figure 1C:
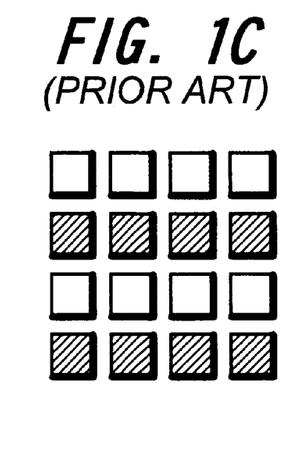
Figure 1D:
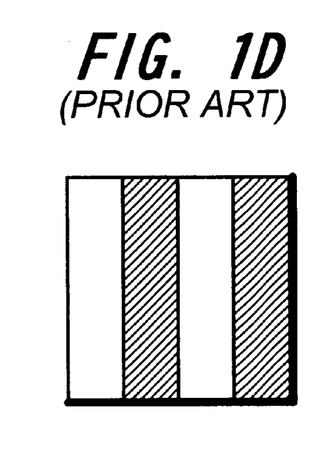
Figure 1E:
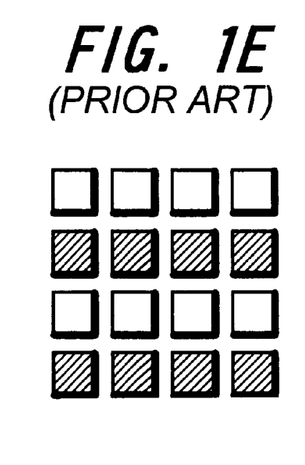

The reason for generation of this pseudo signal is that since green pixels G of a color filter are arranged in a checkered pattern as shown in FIG. 1A and hence interpolation must be carried out in order to generate an aperture compensation signal, e.g., the aperture compensation signal must be generated after the interpolation is carried out with a horizontal-direction mean value of a green signal, if such horizontal-direction interpolation is carried out and an object has a horizontal stripe pattern with a spatial frequency of ½ as shown in FIG. 1B, then resolution can be carried out as shown in FIG. 1C, but if such horizontal-direction interpolation is carried out and an object has a vertical stripe pattern with a spatial frequency of ½ as shown in FIG. 1D, then a pseudo signal representing a horizontal stripe as shown in FIG. 1E is generated.

Contrary, if this interpolation is carried out with a vertical-direction mean value of the green signals, then if an object has a horizontal stripe pattern with a spatial frequency of ½, then consequently an aperture compensation signal disadvantageously generates a pseudo signal representing a vertical stripe. As a result, the aperture compensation signal disadvantageously generates a pseudo contour at horizontal and vertical edges.

SUMMARY OF THE INVENTION

In view of such aspects, it is an object of the present invention to improve a resolution without generating a pseudo signal in a solid-state imaging device.

According to a first aspect of the present invention, a solid-state imaging device having a color filter of a checkered pattern arranged in an all-pixel reading solid-state image sensor includes an original signal aperture compensation means for forming an original signal aperture compensation signal from all pixels of a color filter, a luminance signal aperture compensation means for forming a luminance signal aperture compensation signal from a luminance signal obtained by synthesizing the all pixels of the color filter, and a chrominance signal ratio detecting means for detecting an output ratio of chrominance signals. The original signal aperture compensation signal and the luminance signal aperture compensation signal are weighed in response to a detection output from the chrominance signal ratio detecting means. Thereafter, the weighed original signal aperture compensation signal and the weighed luminance signal aperture compensation signal are added to obtain an aperture compensation signal.

According to a second aspect of the present invention, a color solid-state imaging device having a color filter of a checkered pattern arranged in an all-pixel reading solid-state image sensor includes an original signal aperture compensation means for forming an original signal aperture compensation signal from all pixels of a color filter, a chrominance signal detecting means for detecting whether an object is colored or colorless, and a storage means for previously storing a gain coefficient for aperture compensation. The gain coefficient of the storage means is read out in response to a chrominance signal detection signal from the chrominance signal detecting means and the original signal aperture compensation signal is weighed in response to the gain coefficient.

DESCRIPTION OF THE PREFERRED EMBODIMENTS

A solid-state imaging device according to a first embodiment of the present invention will hereinafter be described with reference to the accompanying drawings.

Figure 2:
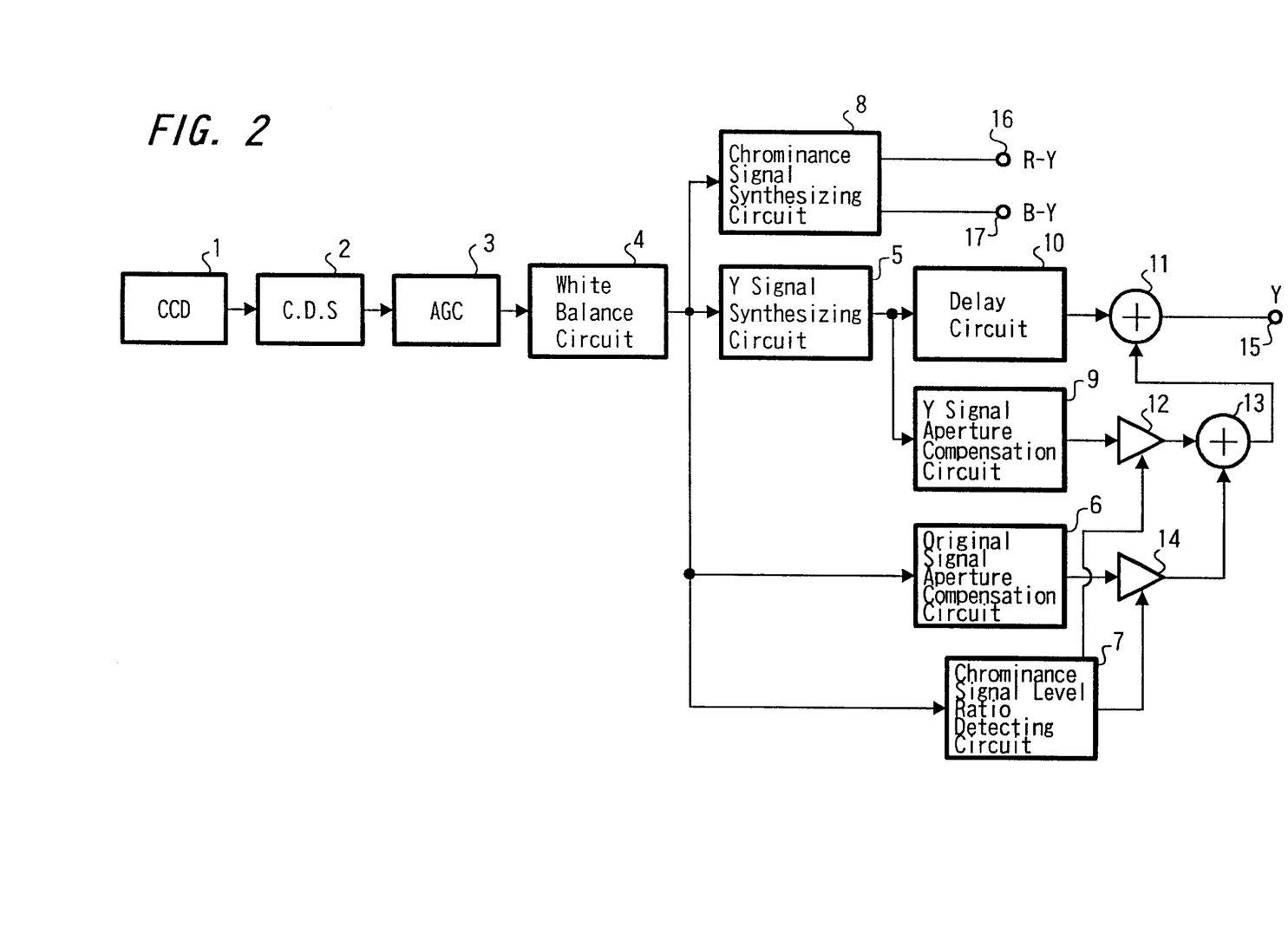
FIG. 2 is a block diagram showing an arrangement of a solid-state imaging device according to a first embodiment of the present invention.
Figure 3:
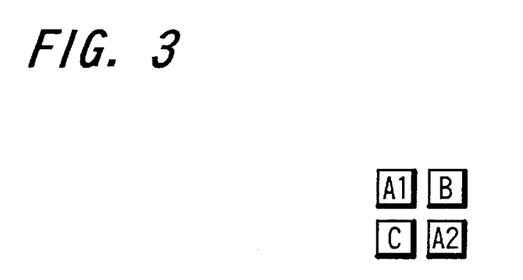
FIG. 3 is a diagram showing an example of a color filter according to the first embodiment of the present invention.

In FIG. 2 which is a diagram showing the first embodiment of the solid-state imaging device of the present invention, there is provided an arrangement of an all-pixel reading solid-state imaging device 1 formed of a CCD and so on. A color filter having a checkered pattern as shown in FIG. 1A or FIG. 3 is disposed on an image pickup surface of the solid-state imaging device 1. In FIG. 3, reference symbols $A_1$ and $A_2$ represent green, and reference symbols B and C respectively represent, for example, red and blue or yellow and cyan or the like. It is assumed in this case that colors $A_1$, $A_2$, B and C can be separated.

The solid-state imaging device 1 supplies its output signal to a white balance circuit 4 successively through a correlation double sampling (CDS) circuit 2 and an automatic gain control (AGC) circuit 3. In this embodiment, since the color filter has an arrangement of three primary colors, i.e., green, red and blue, the white balance circuit 4 is provided, while if the color filter has not the arrangement of the three primary colors but an arrangement of complementary colors, a level balance circuit is provided instead of the white balance circuit 4.

The white balance circuit (level balance circuit) 4 adjusts a level of each of color signals obtained when an object is a white one. Since the white balance circuit (level balance circuit) 4 adjusts the level of each of the color signals obtained when white is displayed, as described later on, it is possible to maximize an aperture response obtained when an aperture compensation signal is generated from an original signal.

The white balance circuit 4 supplies its output signal to a luminance-signal synthesizing circuit (Y signal synthesizing circuit) 5 for synthesizing a luminance signal Y, an original-signal aperture compensation circuit 6 for forming an aperture compensation signal directly from an original signal, a color signal ratio detecting circuit 7 for detecting a level ratio of the chrominance signals, and a color signal synthesizing circuit 8 for synthesizing chrominance signals.

In the solid-state imaging device having the all-pixel reading CCD arrangement and employing color filters each having green checkered arrangement shown in FIG. 3, the luminance signal synthesizing circuit 5 for synthesizing the luminance signals Y synthesizes the luminance signals Y in accordance with the following equation.

$$Y = k \times A_1 + l \times A_2 + m \times B + n \times C$$

where k, l, m and n are coefficients.

A luminance signal Y obtained on the output side of the luminance signal synthesizing circuit 5 is supplied to a luminance signal aperture compensation circuit 9 for forming an aperture compensation signal from the obtained luminance signal Y and also supplied through a predetermined delay circuit 10 to an adder circuit 11.

Figure 4A:
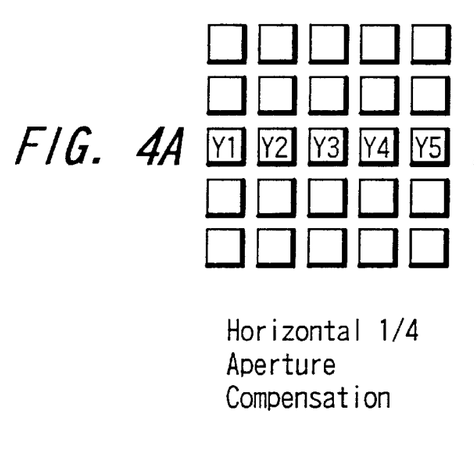
FIGS. 4A and 4B are diagrams used to explain how to obtain a luminance signal aperture compensation signal according to the first embodiment of the present invention.
Figure 4B:
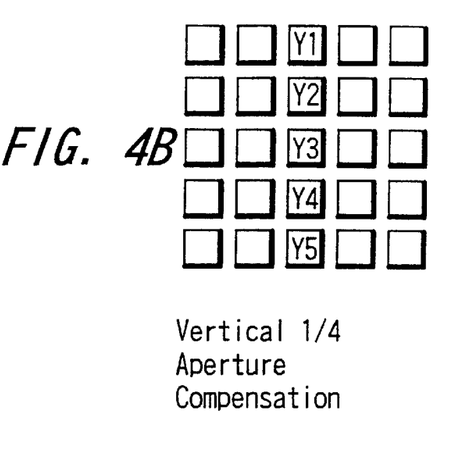

As shown in FIGS. 4A and 4B, the luminance signal aperture compensation circuit 9 obtains a luminance signal aperture compensation signal from signals obtained as a luminance signal by interpolating respective pixel signals, obtains a horizontal ¼ aperture compensation signal and a vertical ¼ aperture compensation signal, and outputs a signal obtained by adding the horizontal ¼ aperture compensation signal and the vertical ¼ aperture compensation signal.

The horizontal ¼ aperture compensation signal and the vertical ¼ aperture compensation signal can be obtained by a known synthesizing method in accordance with the following equation.

$$Yap¼ = -½ \times Y_1 + Y_3 - ½ \times Y_5$$

Figure 5A:
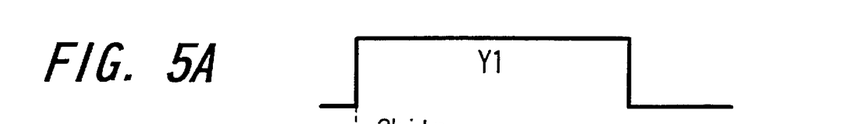
FIGS. 5A to 5F are diagrams used to explain how to synthesize the aperture compensation signal according to the first embodiment of the present invention.

Moreover, when the horizontal ¼ aperture compensation signal is synthesized, it is assumed that the original luminance signal is shown in FIG. 5A. The original luminance signal Y1 is phase shifted by an amount of two pixels (two bits) to obtain a luminance signal Y3 shown in FIG. 5B, and also phase shifted by an amount of four pixels (four bits) to obtain a luminance signal Y5 shown in FIG. 5C. Subsequently, the as shown in FIG. 5D, the original luminance signal Y1 and the luminance signal Y5 are added and then divided into halves (½(Y1+Y5)).

Figure 5B:
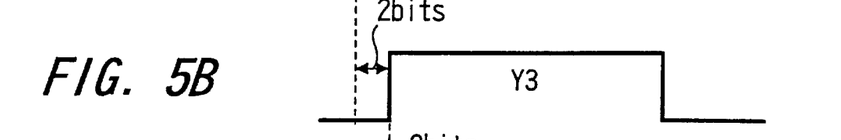
Figure 5C:
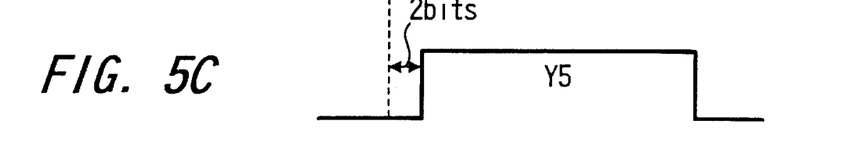
Figure 5D:
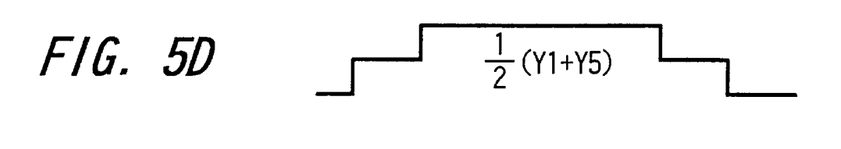
Figure 5E:
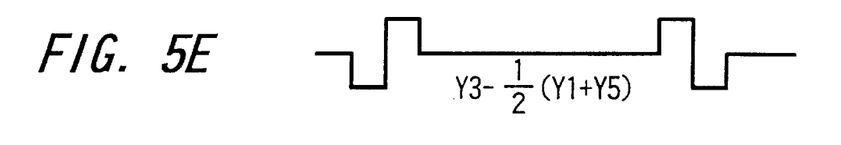
Figure 5F:
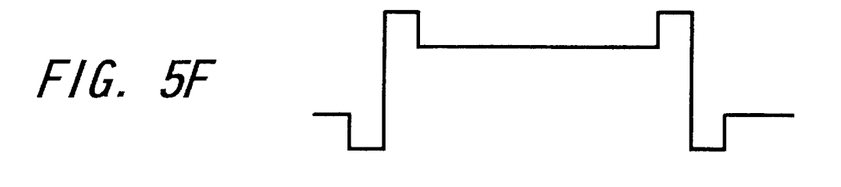

The signal ½(Y1+Y5) shown in FIG. 5D is subtracted from the luminance signal Y3 shown in FIG. 5B to obtain an aperture compensation signal shown in FIG. 5E which satisfies the above equation. For example, the aperture compensation signal shown in FIG. 5E is added to the luminance signal Y3 shown in FIG. 5B, thereby a signal shown in FIG. 5F used for emphasizing a contour being obtained. The vertical ¼ aperture compensation signal is also processed similarly.

The luminance signal aperture compensation circuit 9 outputs the signal through a band-pass filter in order to increase a gain of the spatial frequency of ¼.

The luminance signal aperture compensation circuit 9 can emphasize a contour of a colored or colorless object in order to form the aperture compensation signal by using the luminance signal Y. A luminance signal aperture compensation signal obtained on the output side of the luminance signal aperture compensation circuit 9 is supplied through a variable gain amplifier circuit 12 for weighing the luminance signal aperture compensation signal to one input terminal of an adder circuit 13.

Figure 6A:
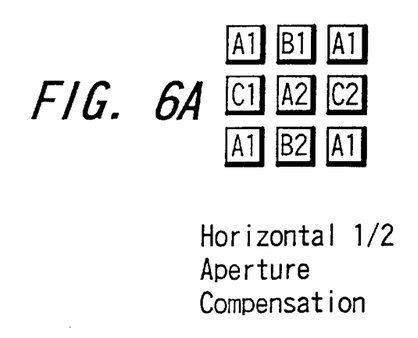
FIGS. 6A and 6B are diagrams used to explain how to obtain a chrominance signal aperture compensation signal according to the first embodiment of the present invention.
Figure 6B:
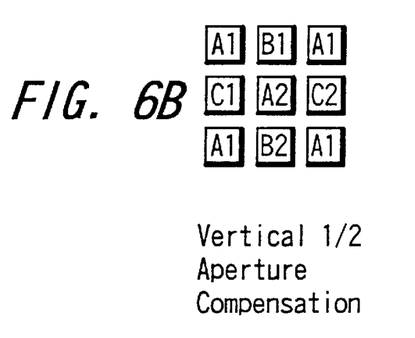

The original signal aperture compensation circuit 6 obtains an original signal aperture compensation signal from original signals from all the pixels of a color filter as shown in FIGS. 6A and 6B, obtains a horizontal ½ aperture compensation signal and a vertical ½ aperture compensation signal, and outputs a signal obtained by adding the horizontal ½ aperture compensation signal and the vertical ½ aperture compensation signal.

The horizontal ½ aperture compensation signal and the vertical ½ aperture compensation signal can be obtained by a known synthesizing method. The horizontal ½ aperture compensation signal is obtained in accordance with the following equation.

$$Yap½ = -½ \times C1 + A2 - ½ \times C2$$

The vertical ½ aperture compensation signal is obtained in accordance with the following equation.

$$Yap½ = -½ \times B1 + A2 - ½ \times B2$$

Figure 7A:
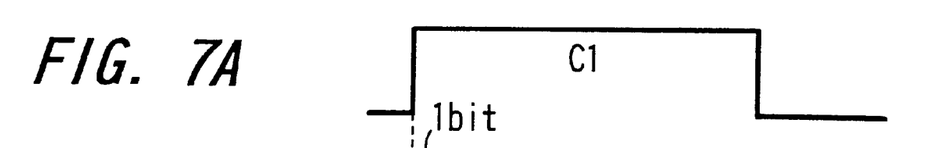
FIGS. 7A to 7F are diagrams used to explain how to obtain the chrominance signal aperture compensation signal according to the first embodiment of the present invention.
Figure 7B:
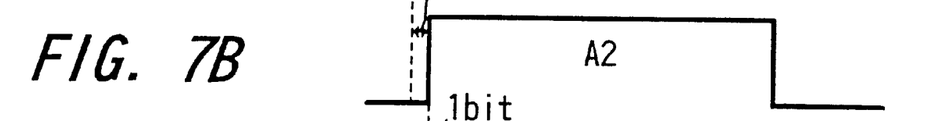
Figure 7C:
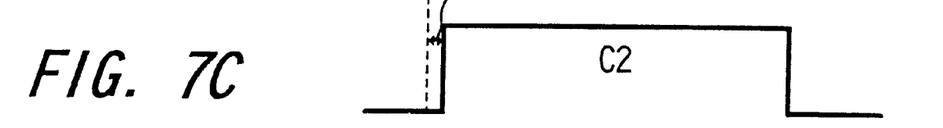

Moreover, when the horizontal ½ aperture compensation signal is synthesized, a chrominance signal C1 shown in FIG. 7A is phase shifted by an amount of one pixel (one bit) in the horizontal direction to obtain a chrominance signal A2 shown in FIG. 7B, and also phase shifted by an amount of two pixels (two bits) to obtain a chrominance signal C2 shown in FIG. 7C. Subsequently, as shown in FIG. 7D, the chrominance signal C1 and the chrominance signal C2 are added and then divided into halves (½(C1+C2)).

Figure 7D:
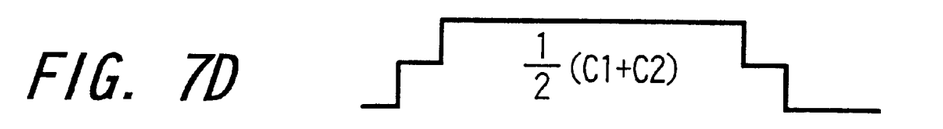
Figure 7E:
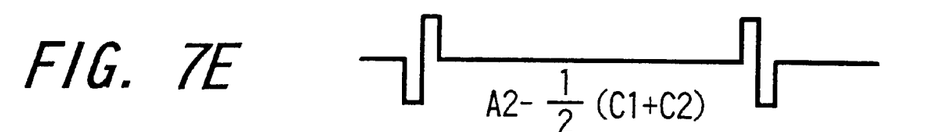
Figure 7F:
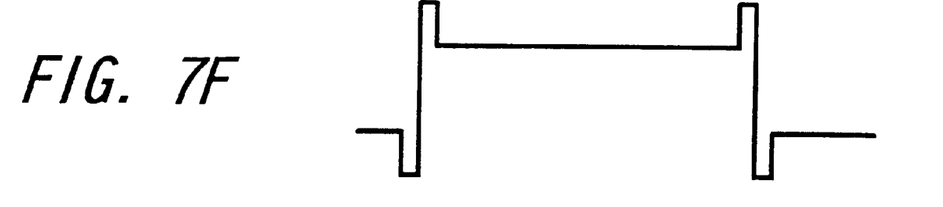

The signal ½(C1+C2) shown in FIG. 7D is subtracted from the chrominance signal A2 shown in FIG. 7B to obtain an aperture compensation signal shown in FIG. 7E which satisfies the above equation. For example, the aperture compensation signal shown in FIG. 7E is added to the chrominance signal A2 shown in FIG. 7B, thereby a signal shown in FIG. 7F used for emphasizing a contour being obtained. The vertical ½ aperture compensation signal is also processed similarly.

The original signal aperture compensation circuit 6 outputs the signal through a band-pass filter in order to increase a gain of the spatial frequency of ½.

Since the original signal aperture compensation circuit 6 does not interpolate all the original signals from pixels of the color filters and hence their spatial frequency region is extended to a spatial frequency of ½, it is possible to increase a gain of the spatial frequency by an amount of ½ when an object is colorless. An original signal aperture compensation signal obtained on the output side of the original signal aperture compensation circuit 6 is supplied through a variable gain amplifier circuit 14 for weighing the original signal aperture compensation signal to the other input terminal of the adder circuit 13.

The chrominance signal ration detecting circuit 7 is a circuit for detecting how much an object is colored. The chrominance signal ration detecting circuit 7 calculates a ratio among levels of different colors and, based on this ratio, determines how larger or smaller this ratio is as compared with a standard value thereof obtained when white is displayed. Thus, the chrominance signal ratio detecting circuit 7 controls the gains of the variable gain amplifier circuits 12, 14 based on the determination.

In the first embodiment, if determining that the level ratio is approximate to the standard value obtained when white is displayed, the chrominance signal ratio detecting circuit 7 determines that an object is colorless. Then, the chrominance signal ratio detecting circuit 7 lowers the gain of the variable gain amplifier circuit 12 for weighing the luminance signal aperture compensation signal in response to the determination to thereby lower the luminance signal aperture compensation signal and also increase the gain of the variable gain amplifier circuit 14 for weighing the original signal aperture compensation signal in response to the determination to thereby increase the original signal aperture compensation signal.

Thus, it is possible to set the spatial frequency region of the aperture compensation signal obtained by adding the luminance signal aperture compensation signal and the original signal aperture compensation signal and obtained on the output side of the adder circuit 13 to a high spatial frequency region of ½. Hence, it is possible to improve the resolution. In this case, since the object is colorless, the pseudo signal is prevented from being generated.

Contrary, if determining that the level ratio is not close to the standard value obtained when white is displayed, the chrominance signal ratio detecting circuit 7 determines that an object is colored. Then, the chrominance signal ratio detecting circuit 7 increases the gain of the variable gain amplifier circuit 12 for weighing the luminance signal aperture compensation signal in response to the determination to thereby increase the luminance signal aperture compensation signal by that amount and also lowers the gain of the variable gain amplifier circuit 14 for weighing the original signal aperture compensation signal in response to the determination to thereby lower the original signal aperture compensation signal by that amount.

Thus, it is possible to suppress the pseudo signal while the spatial frequency region of the aperture compensation signal obtained by adding the luminance signal aperture compensation signal and the original signal aperture compensation signal and obtained at the output side of the adder circuit 13 is shifted to a region of ¼.

In this case, since the gains of the variable gain amplifier circuits 12 and 14 can be continuously changed, the aperture compensation signal obtained on the output side of the adder circuit 13 can be continuously changed within the range of the spatial frequency region from ½ to ¼.

The aperture compensation signal obtained on the output side of the adder circuit 13 is supplied to the adder circuit 11, thereby a luminance signal added with a contour emphasizing signal being obtained at a luminance signal output terminal 15 derived from the output side of the adder circuit 11.

In the chrominance signal synthesizing circuit 8, color difference signals (R-Y) and (B-Y) are obtained at one output terminal 6 thereof and the other output terminal 17 thereof, respectively (where R represents a red signal, B a blue signal, and Y a luminance signal).

According to the first embodiment, as described above, when the object is colorless and hence a pseudo signal is prevented from being generated, the luminance signal aperture compensation signal is weighed such that the original signal aperture compensation signals formed from the original signals from all the pixels of the color filters are used. Therefore, the spatial frequency region of the aperture compensation signal is extended to the spatial frequency of ½ and hence it is advantageously possible to increase the resolution without generation of the pseudo contour.

According to the first embodiment, while it is impossible to increase the resolution in a case of a colored object as compared with that of a colorless object, it is advantageously possible to suppress the pseudo signal. In general, since human eyes have characteristics that resolution with respect to luminance is high but resolution with respect to color is lowered, if an object is colored, this human visual characteristic becomes effective and hence the resolution is not lowered so much.

A color solid-state imaging device according to a second embodiment of the present invention will hereinafter be described with reference to the accompanying drawings.

Figure 8:
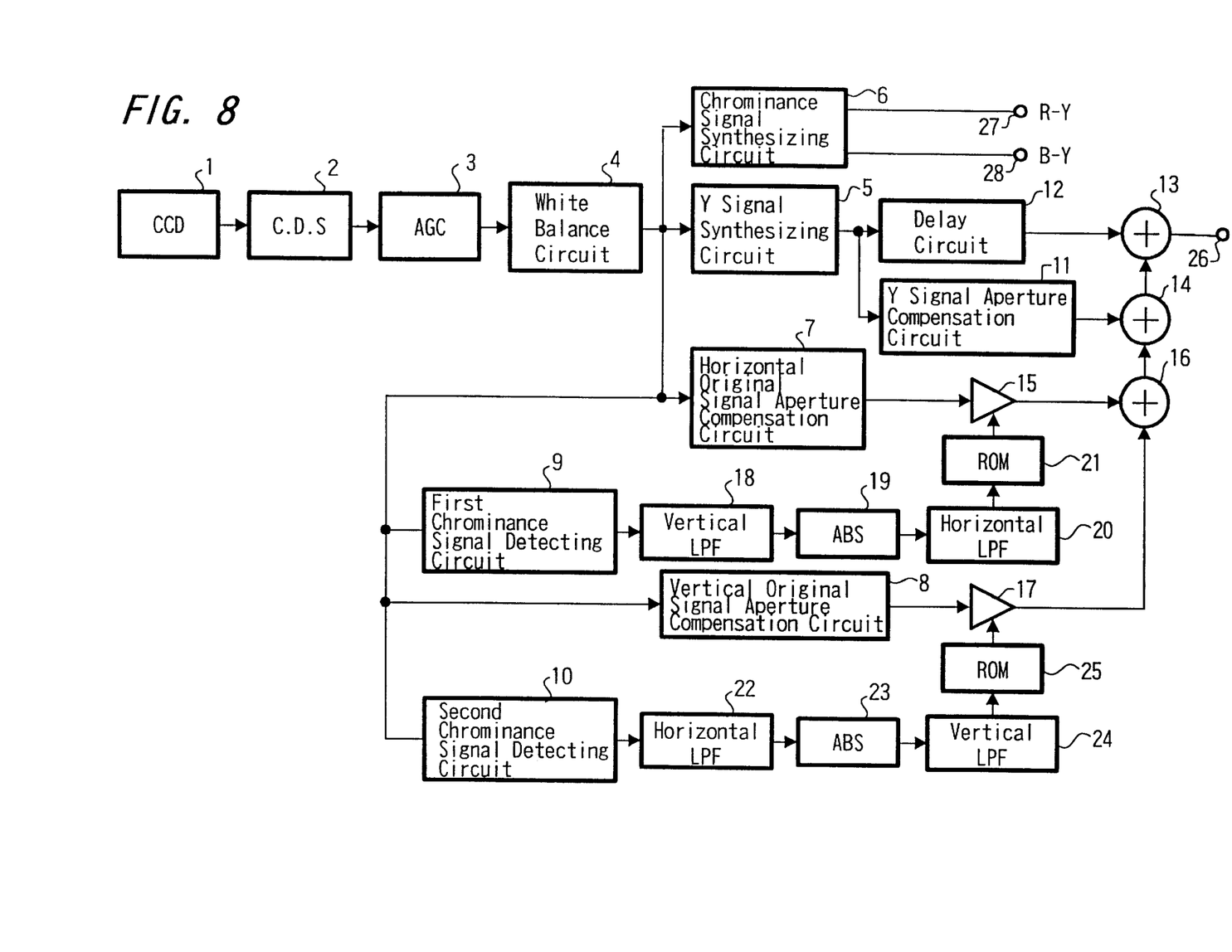
FIG. 8 is a block diagram showing an arrangement of a solid-state imaging device according to a second embodiment of the present invention.

In FIG. 8 which is a block diagram showing the second embodiment of the solid-state imaging device of the present invention, there is provided an arrangement of an all-pixel reading solid-state imaging device 1 formed of a CCD and so on. A color filter having a checkered pattern as shown in FIG. 1A or FIG. 3 is disposed on an image pickup surface of the solid-state imaging device 1. In FIG. 3, reference symbols $A_1$ and $A_2$ represent green, and reference symbols B and C respectively represent, for example, red and blue or yellow and cyan or the like. It is assumed in this case that colors $A_1$, $A_2$, B and C can be separated. When the color filter having the color arrangement of the horizontal two-pixel repetition x vertical two-pixel repetition as shown in FIG. 3 is provided, the most high resolution can be achieved as long as the color separation is possible.

The solid-state imaging device 1 supplies its output signal to a white balance circuit 4 successively through a correlation double sampling (CDS) circuit 2 and an automatic gain control (AGC) circuit 3. In this embodiment, since the color filter has an arrangement of three primary colors, i.e., green, red and blue, the white balance circuit 4 is provided, while if the color filter has not the arrangement of the three primary colors but an arrangement of complementary colors, a level balance circuit is provided instead of the white balance circuit 4.

The white balance circuit (level balance circuit) 4 adjusts a level of each of color signals obtained when an object is a white one. Since the white balance circuit (level balance circuit) 4 adjusts the level of each of the color signals obtained when a white object is to be picked up, as described later on, it is possible to maximize an aperture response obtained when an aperture compensation signal is generated from an original signal.

The white balance circuit 4 supplies its output signal to a luminance-signal synthesizing circuit (Y signal synthesizing circuit) 5 for synthesizing a luminance signal Y, a chrominance signal synthesizing circuit 6 for synthesizing chrominance signals, a horizontal original-signal aperture compensation circuit 7 for forming a horizontal aperture compensation signal directly from original signals, a vertical original-signal aperture compensation circuit 8 for forming a vertical aperture compensation signal directly from original signals, a first chrominance signal detecting circuit 10 for detecting whether or not an object is colored, and a second chrominance signal detecting circuit 9 for detecting whether or not an object is colored.

When the solid-state imaging device having the all-pixel reading CCD arrangement and employing color filters each having green checkered arrangement as shown in FIG. 3 is employed, if white balance is satisfied, then the luminance signal synthesizing circuit 5 for synthesizing the luminance signal Y synthesizes the luminance signal Y in accordance with the following equation.

$$Y = A_1 + A_2 + B + C$$

A luminance signal Y obtained on the output side of the luminance signal synthesizing circuit 5 is supplied to a luminance signal aperture compensation circuit 11 for forming an aperture compensation signal from the obtained luminance signal Y and also supplied through a predetermined delay circuit 12 to an adder circuit 13.

As shown in FIGS. 4A and 4B, the luminance signal aperture compensation circuit 11 obtains a luminance signal aperture compensation signal from signals obtained as a luminance signal by interpolating respective pixel signals, obtains a horizontal ¼ aperture compensation signal and a vertical ¼ aperture compensation signal, and outputs a signal obtained by adding the horizontal ¼ aperture compensation signal and the vertical ¼ aperture compensation signal.

The horizontal ¼ aperture compensation signal and the vertical ¼ aperture compensation signal can be obtained by a known synthesizing method in accordance with the following equation.

$$Yap¼ = -½Y1 + Y3 - ½ \times Y5$$

Moreover, when the horizontal ¼ aperture compensation signal is synthesized, it is assumed that the original luminance signal is shown in FIG. 5A. The original luminance signal Y1 is phase shifted by an amount of two pixels (two bits) to obtain a luminance signal Y3 shown in FIG. 5B, and also phase shifted by an amount of four pixels (four bits) to obtain a luminance signal Y5 shown in FIG. 5C. Subsequently, as shown in FIG. 5D, the original luminance signal Y1 and the luminance signal Y5 are added and then divided into halves (½(Y1+Y5)).

The signal ½(Y1+Y5) shown in FIG. 5D is subtracted from the luminance signal Y3 shown in FIG. 5B to obtain an aperture compensation signal shown in FIG. 5E which satisfies the above equation. For example, the aperture compensation signal shown in FIG. 5E is added to the luminance signal Y3 shown in FIG. 5B, thereby a signal shown in FIG. 5F used for emphasizing a contour being obtained. The vertical ¼ aperture compensation signal is also synthesized similarly.

The luminance signal aperture compensation circuit 11 outputs the signal through a band-pass filter in order to increase a gain of the spatial frequency of ¼.

The luminance signal aperture compensation circuit 11 can emphasize a contour of a colored or colorless object in order to form the aperture compensation signal by using the luminance signal Y. A luminance signal aperture compensation signal obtained on the output side of the luminance signal aperture compensation circuit 11 is supplied to one input terminal of an adder circuit 14.

The horizontal original signal aperture compensation circuit 7 obtains a horizontal original signal aperture compensation signal from original signals from all the pixels of a color filter shown in FIG. 6A, and obtains a horizontal ½ aperture compensation signal.

In the second embodiment, the horizontal original signal aperture compensation circuit 7 obtains a signal indicative of difference between adjacent pixel signals in the horizontal direction and employs the signal as the horizontal original signal aperture compensation signal. The horizontal original signal aperture compensation signal is obtained in accordance with the following equation.

$$Yap½ = C1 + A2$$

In deed, this horizontal original signal aperture compensation signal is an aperture compensation signal which is effective with respect to only one direction, but such aperture compensation signal is not practically problematic in consideration of an object of improving characteristics in the vicinity of a limit of a Nyquist's rate.

Figures 9A, 9B:
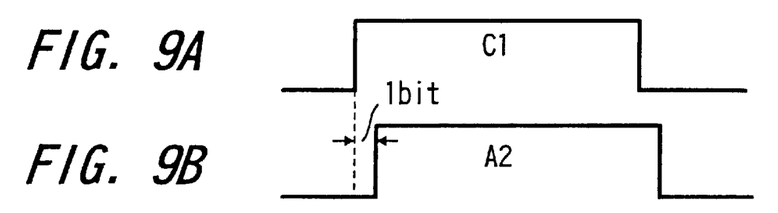
FIGS. 9A to 9D are diagrams used to explain how to obtain the chrominance signal aperture compensation signal according to the second embodiment of the present invention.

Moreover, when the horizontal ½ aperture compensation signal is synthesized, a chrominance signal C1 shown in FIG. 9A is phase shifted by an amount of one pixel (one bit) in the horizontal direction to obtain a chrominance signal A2 shown in FIG. 9B. The chrominance signal C1 is subtracted from the chrominance signal A2 to obtain an aperture compensation signal shown in FIG. 9C which satisfies the above equation.

Figure 9C:
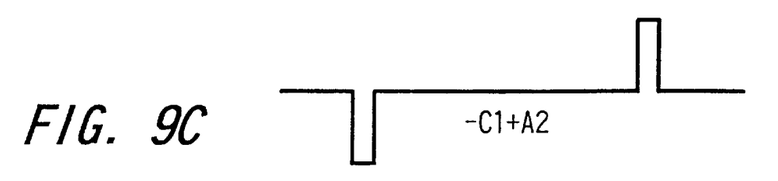
Figure 9D:
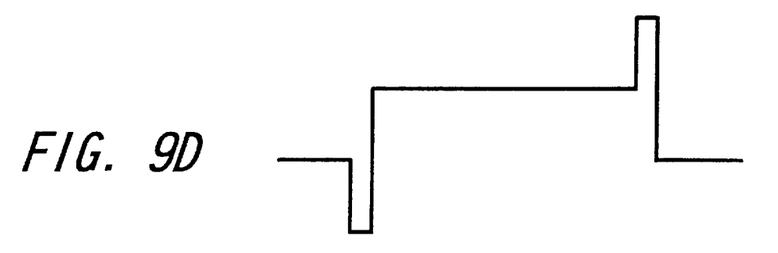

In this case, for example, the aperture compensation signal shown in FIG. 9C is added to the chrominance signal A2 shown in FIG. 9B, thereby a signal shown in FIG. 9D used for emphasizing a contour of only one side being obtained. The horizontal original signal aperture compensation circuit 7 outputs the signal through a band-pass filter in order to increase a gain of the spatial frequency of ½.

Since the horizontal original signal aperture compensation circuit 7 does not interpolate all the original signals from pixels of the color filters and hence their spatial frequency region is extended to a spatial frequency of ½, it is possible to increase a gain of the spatial frequency by an amount of ½ when an object is colorless. A horizontal original signal aperture compensation signal obtained on the output side of the horizontal original signal aperture compensation circuit 7 is supplied through a variable gain amplifier circuit 15 for weighing the horizontal original signal aperture compensation signal to an adder circuit 16.

The vertical original signal aperture compensation circuit 8 obtains a vertical original signal aperture compensation signal from original signals from all the pixels of a color filter shown in FIG. 6B.

In the second embodiment, the vertical original signal aperture compensation circuit 8 obtains a signal indicative of difference between adjacent pixel signals in the vertical direction and employs the signal as the vertical original signal aperture compensation signal. The vertical original signal aperture compensation signal is obtained in accordance with the following equation.

$$Yap½ = -B1 + A2$$

In deed, this vertical original signal aperture compensation signal is an aperture compensation signal which is effective with respect to only one direction, but such aperture compensation signal is not practically problematic in consideration of an object of improving characteristics in the vicinity of a limit of a Nyquist's rate.

The vertical original signal aperture compensation circuit 8 outputs the signal through a band-pass filter in order to increase a gain of the spatial frequency of ½.

Since the vertical original signal aperture compensation circuit 8 does not interpolate all the original signals from pixels of the color filters and hence their spatial frequency region is extended to a spatial frequency of ½, it is possible to increase a gain of the spatial frequency by an amount of ½ when an object is colorless. A vertical original signal aperture compensation signal obtained on the output side of the vertical original signal aperture compensation circuit 8 is supplied through a variable gain amplifier circuit 17 for weighing the vertical original signal aperture compensation signal to the adder circuit 16.

The first and second chrominance signal detecting circuits 9 and 10 are circuits each for calculating how much an object is colored, i.e., for calculating a signal indicative of difference between different colors. Specifically, each of the first and second chrominance signal detecting circuits 9 and 10 calculates (R-G)/(G-B) to obtain a level of color (wherein R, G, B respectively represent a red signal, a green signal and a blue signal). Thus, the first and second chrominance signal detecting circuits 9 and 10 determine how larger or smaller the calculated color level is as compared with a standard value obtained when the object is white, and, based on the determination results, change gain coefficients to be supplied to the variable gain amplifier circuits 15, 17, respectively.

Specifically, when the value of (R-G)/(G-B) is approximate to the standard value obtained when the object is white, the first and second chrominance signal detecting circuits 9 and 10 determine that the object is colorless, and increase the gain coefficients to be supplied to the variable gain amplifier circuits 15 and 17, respectively. Thus, it is possible to increase the gain in the spatial frequency region of ½ and hence the resolution is improved.

Contrary, when the value of (R-G)/(G-B) is not approximate to the standard value obtained when the object is white, even if a signal obtained by image pickup of the object does not include high-frequency components, a signal component modulated due to color corresponds to a spatial frequency of ½ and hence the signal component is erroneously detected as the aperture compensation signal. Therefore, the first and second chrominance signal detecting circuits 9 and 10 decrease the gain coefficients to be supplied to the variable gain amplifier circuits 15 and 17, respectively. As a result, it is possible to suppress the pseudo signal generated when the object is colored.

In general human visual characteristics, resolution with respect to color is inferior to that with respect to luminance. Therefore, it is possible to utilize the human visual characteristics by carrying out the above determinations.

When the color filters having an arrangement of a green checkered pattern is employed, there are two methods of calculating a signal (R-G)/(G-B) to detect a chrominance signal therefrom: one method of calculating a signal (R-G)/(G-B) by calculating difference between signals in the horizontal direction; and the other method of calculating a signal (R-G)/(G-B) by calculating difference in the vertical direction.

In the second embodiment, the first chrominance signal detecting circuit 9 for weighing the horizontal original signal aperture compensation signal calculates the difference between the signals of the pixels in the vertical direction, and the second chrominance signal detecting circuit 10 for weighing the vertical original signal aperture compensation signal calculates the difference between the signals in the horizontal direction.

The reason for this is that since the horizontal original signal aperture compensation circuit 7 calculates the difference between signals of pixels adjacent to each other in the horizontal direction and the vertical original signal aperture compensation circuit 8 calculates the difference between signals of pixels adjacent to each other in the vertical direction, if the calculation of the difference between the signals for weighing is carried out by using the signals in the direction as those used in calculation for the aperture compensation signals, then it is impossible to determine whether the signal is a color signal component or only a high frequency signal.

The first chrominance signal detecting circuit 9 supplies its output chrominance signal detection signal through a vertical low-pass filter 18 and an absolute-value circuit 19 to a horizontal low-pass filter 20. The vertical low-pass filter 18 calculates a mean value from detection values of a predetermined number, e.g., three detection values which are sequential in the vertical direction. The horizontal low-pass filter 20 calculates a mean value from detection values of a predetermined number, e.g., three detection values which are sequential in the horizontal direction.

The reason for supplying the detection signal of the first chrominance signal detecting circuit 9 through the vertical low-pass filter 18 is that when a picture of an oblique object is input even if the picture is colorless, if the value of (R-G)/(G-B) is calculated by using the signals of the pixels in the vertical direction, then an oblique edge is detected, which leads to an erroneous detection of color. This means that the chrominance signal detection signal (color temperature detection signal) itself has discontinuous values at the oblique edge and consequently the horizontal original signal aperture compensation signal is influenced by a resultant discontinuous gain coefficients to thereby generate the pseudo signal.

Therefore, in the second embodiment, the chrominance signal detection signal of the first chrominance signal detecting circuit 9 is supplied to the vertical low-pass filter 18 which smooths the discontinuous values at the oblique edge.

The absolute value circuit 19 converts the chrominance signal detection signal into an absolute value and supplies the absolute value to the horizontal low-pass filter 20. The reason for this processing is that only an absolute value level of the chrominance signal detection signal is required for the gain coefficient of the aperture compensation regardless of whether the level is positive or negative. Moreover, when data is stored in a storage device 21 such as a ROM or the like as described later on, if the level is positive or negative, then a double capacity of the storage device 21 such as the ROM or the like must be required. Therefore, in order to reduce a circuit size, only the absolute value level is required.

The reason for providing the horizontal low-pass filter 20 is that a spatial phase of the chrominance signal detection signal is made matched with that of the horizontal original signal aperture compensation signal output from the horizontal original signal aperture compensation circuit 7. In response to an output signal from the horizontal low-pass filter 20, a gain coefficient previously stored in the storage device 21 such as the ROM or the like is read out and supplied to the variable gain amplifier circuit 15 for weighing the horizontal original signal aperture compensation signal. Thus, a gain of the variable gain amplifier circuit 15 is determined.

Figure 10:
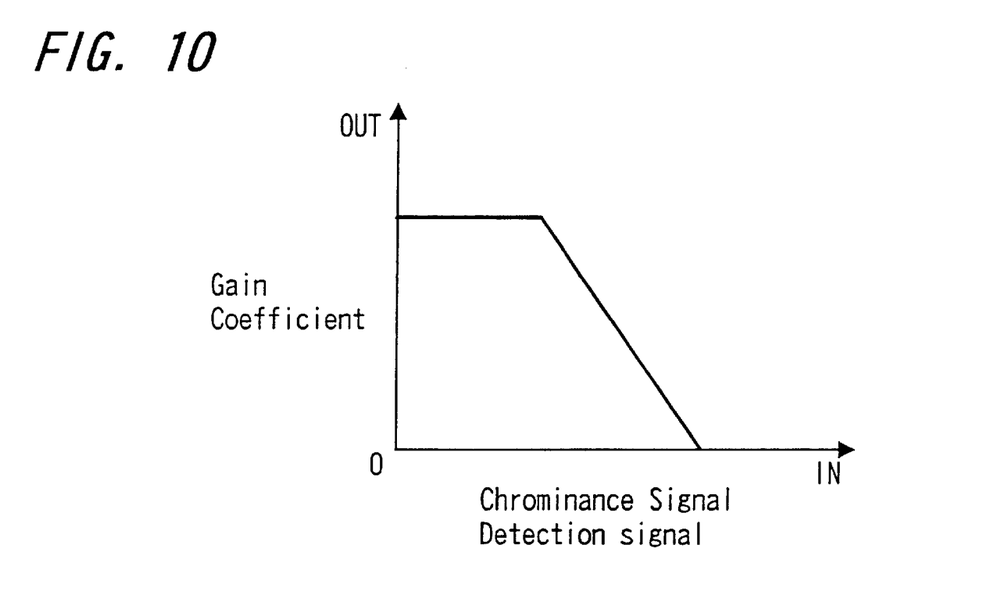
FIG. 10 is a graph showing a relationship of a level of a chrominance signal detection signal and a gain coefficient according to the second embodiment of the present invention.

In accordance with a table previously stored in the storage device 21 such as a ROM or the like, as shown in FIG. 10, if the level of the chrominance signal detection signal obtained at the output side of the horizontal low-pass filter 20 is a predetermined level or smaller, then it is determined that the object is colorless and the gain coefficient is set to a maximum value, and if the level is larger than the predetermined level, then it is determined that the object is colored and the gain coefficient is set so as to gradually become smaller as the level is larger. The relationship between the chrominance signal detection signal and the gain coefficient shown in FIG. 10 is determined after repeated trial and error.

The second chrominance signal detecting circuit 10 supplies its output chrominance signal detection signal through a horizontal low-pass filter 22 and an absolute value circuit 23 to a vertical low-pass filter 24. The horizontal low-pass filter 22 calculates a mean value from detection values of a predetermined number, e.g., three detection values which are sequential in the horizontal direction. The vertical low-pass filter 24 calculates a mean value from detection values of a predetermined number, e.g., three detection values which are sequential in the vertical direction.

The reason for supplying the detection signal of the second chrominance signal detecting circuit 10 through the horizontal low-pass filter 22 is that when a picture of an oblique object is input even if the picture is colorless, if the value of (R-G)/(G-B) is calculated by using the signals of the pixels in the horizontal direction, then an oblique edge is detected, which leads to an erroneous detection of color. This means that the chrominance signal detection signal (color temperature detection signal) itself has discontinuous values at the oblique edge and consequently the horizontal original signal aperture compensation signal is influenced by a resultant discontinuous gain coefficients to thereby generate the pseudo signal.

Therefore, in the second embodiment, the chrominance signal detection signal of the second chrominance signal detecting circuit 10 is supplied to the horizontal low-pass filter 22 which smooths the discontinuous values at the oblique edge.

The absolute value circuit 23 converts the chrominance signal detection signal into an absolute value and supplies the absolute value to the vertical low-pass filter 24. The reason for this processing is that only an absolute value level of the chrominance signal detection signal is required for the gain coefficient of the aperture compensation regardless of whether the level is positive or negative. Moreover, when data is stored in a storage device 25 such as a ROM or the like as described later on, if the level is positive or negative, then a double capacity of the storage device 25 such as the ROM or the like must be required. Therefore, in order to reduce a circuit size, only the absolute value level is required.

The reason for providing the vertical low-pass filter 24 is that a spatial phase of the chrominance signal detection signal is made matched with that of the vertical original signal aperture compensation signal output from the vertical original signal aperture compensation circuit 8. In response to an output signal from the vertical low-pass filter 24, a gain coefficient previously stored in the storage device 25 such as the ROM or the like is read out and supplied to the variable gain amplifier circuit 17 for weighing the horizontal original signal aperture compensation signal. Thus, a gain of the variable gain amplifier circuit 17 is determined.

In accordance with a table previously stored in the storage device 25 such as a ROM or the like, as shown in FIG. 10, if the level of the chrominance signal detection signal obtained at the output side of the vertical low-pass filter 24 is a predetermined level or smaller, then it is determined that the object is colorless and the gain coefficient is set to a maximum value and if the level is larger than the predetermined level, then it is determined that the object is colored and the gain coefficient is set so as to gradually become smaller as the level is larger. The relationship between the chrominance signal detection signal and the gain coefficient shown in FIG. 10 is determined after repeated trial and error.

The adder circuit 16 adds the weighed horizontal original signal aperture compensation signal obtained at the output side of the variable gain amplifier circuit 15 and the weighed vertical original signal aperture compensation signal obtained at the output side of the variable gain amplifier circuit 17 and supplies the original signal aperture compensation signal obtained at the output side of the adder circuit 16 to the other input terminal of the adder circuit 14.

The aperture compensation signal obtained by adding the luminance signal aperture compensation signal obtained on the output side of the adder circuit 14 and the original signal aperture compensation signal is supplied to the adder circuit 13. A luminance signal added with a contour emphasis signal is obtained at a luminance signal output terminal 26 derived from the output side of the adder circuit 13.

In the chrominance signal synthesizing circuit 6, a color difference signal (R-Y) is derived at one output terminal 27 and a color difference signal (B-Y) is derived at the other output terminal 28.

According to the second embodiment, as described above, in the color solid-state imaging device having the color filters of the green checkered pattern, if it can be determined that the object is colorless and hence the pseudo signal is prevented from being generated, the gains of the variable gain amplifier circuits 15 and 17 are set maximum to weigh the original signal aperture compensation signal at maximum. Therefore, the spatial frequency region of the aperture compensation signal can be set to the high region of ½, and hence the resolution can advantageously be improved without generation of the pseudo contour.

According to the second embodiment, since each of the horizontal original signal aperture compensation circuit 7 and the vertical original signal aperture compensation circuit 8 obtains the aperture compensation signal by calculating the signal indicative of difference between the signals of the pixels adjacent to each other, it is possible to increase the spatial frequency in the vicinity of the limit of the Nyquist's rate.

According to the second embodiment, when the horizontal original signal aperture compensation signal is weighed, the first chrominance signal detecting circuit 9 calculates the value of (R-G)/(G-B) by using the signals of the pixels in the vertical direction and employs it as the chrominance signal detection signal (color temperature detection signal), and when the vertical original signal aperture compensation signal is weighed, the second chrominance signal detecting circuit 10 calculates the value of (R-G)/(G-B) by using the signals of the pixels in the horizontal direction and employs it as the chrominance signal detection signal (color temperature detection signal). Therefore, it is possible to reduce the erroneous detection of the chrominance signal erroneous detection of color temperature).

According to the second embodiment, since the vertical low-pass filter filters the chrominance signal detection signal from the first chrominance signal detecting circuit 9 and the horizontal low-pass filter filters the chrominance signal detection signal from the second chrominance signal detecting circuit 10, it is possible to prevent the color from being erroneously detected when the picture of the oblique object is input.

According to the second embodiment, the gain coefficients used for the chrominance signal detection signal and previously stored in the storage devices 21 and 25 such as ROM or the like are employed for weighing the horizontal original signal aperture compensation signal and the vertical original signal aperture compensation signal. Therefore, it is advantageously possible to increase the resolution with accuracy and without generation of the pseudo contour.

While in the first and second embodiments the color filter having the green checkered pattern is employed, the present invention is not limited thereto and the similar effects can be achieved even if a color filter having other checkered pattern is employed.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:
1. A solid-state imaging device having a color filter of a checkered pattern arranged in an all-pixel reading solid-state image sensor, comprising:
   an original signal aperture compensation means for forming an original signal aperture compensation signal from all pixels of a color filter;
   a luminance signal aperture compensation means for forming a luminance signal aperture compensation signal from a luminance signal obtained by synthesizing said all pixels of the color filter; and
   a chrominance signal ratio detecting means for detecting an output ratio of chrominance signals, wherein said original signal aperture compensation signal and said luminance signal aperture compensation signal are weighed in response to a detection output from said chrominance signal ratio detecting means and thereafter said weighed original signal aperture compensation signal and said weighed luminance signal aperture compensation signal are added to obtain an aperture compensation signal.

* * * * *